US009087105B2

(12) United States Patent
Brown et al.

(10) Patent No.: US 9,087,105 B2
(45) Date of Patent: Jul. 21, 2015

(54) RULE-BASED EXTRACTION, TRANSFORMATION, AND LOADING OF DATA BETWEEN DISPARATE DATA SOURCES

(71) Applicant: Adobe Systems Incorporated, San Jose, CA (US)

(72) Inventors: Nicholas J. Brown, West Jordan, UT (US); David L. Cardon, Provo, UT (US); Jason A. Carter, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/645,298

(22) Filed: Oct. 4, 2012

(65) Prior Publication Data

US 2014/0101091 A1 Apr. 10, 2014

(51) Int. Cl.
G06F 17/30 (2006.01)

(52) U.S. Cl.
CPC .... G06F 17/30489 (2013.01); G06F 17/30551 (2013.01)

(58) Field of Classification Search
None
See application file for complete search history.

(56) References Cited

U.S. PATENT DOCUMENTS

| 7,058,615 | B2 | 6/2006 | Yao | |
|---|---|---|---|---|
| 7,111,007 | B2 | 9/2006 | Thier et al. | |
| 7,721,152 | B1 * | 5/2010 | Joshi et al. | 714/25 |
| 8,051,334 | B2 | 11/2011 | Jones et al. | |
| 8,150,814 | B2 | 4/2012 | Felsheim | |
| 8,806,550 | B1 * | 8/2014 | Chan | 725/107 |
| 2004/0049507 | A1 * | 3/2004 | Cole | 707/8 |
| 2006/0117091 | A1 * | 6/2006 | Justin | 709/217 |
| 2006/0200425 | A1 * | 9/2006 | Steele et al. | 705/64 |
| 2007/0055482 | A1 | 3/2007 | Goodermote et al. | |
| 2007/0233644 | A1 | 10/2007 | Bakalash et al. | |
| 2007/0255787 | A1 * | 11/2007 | Richardson et al. | 709/204 |
| 2008/0097843 | A1 * | 4/2008 | Menon et al. | 705/14 |
| 2008/0114815 | A1 * | 5/2008 | Sutoh et al. | 707/200 |
| 2008/0222634 | A1 * | 9/2008 | Rustagi | 718/100 |
| 2009/0204645 | A1 * | 8/2009 | Machida et al. | 707/202 |
| 2009/0210293 | A1 * | 8/2009 | Steele et al. | 705/10 |
| 2010/0083147 | A1 | 4/2010 | Gaffney | |
| 2011/0131079 | A1 * | 6/2011 | Valentine et al. | 705/7.31 |
| 2012/0253908 | A1 * | 10/2012 | Ouimet et al. | 705/14.23 |

FOREIGN PATENT DOCUMENTS

GB 2367464 A * 4/2002 ............. H04L 12/26

* cited by examiner

*Primary Examiner* — Jay Morrison
(74) *Attorney, Agent, or Firm* — Kilpatrick Townsend & Stockton LLP

(57) ABSTRACT

Methods and apparatus are presented for extracting, transforming, and loading data from one database to another database. For example, an extraction, transformation, and loading (ETL) component may access an operational log of a given database in order to detect an update to the database. Upon detecting the update, the ETL component may extract a subset of data from the operational log, where the extraction of the subset of data is based on one or more rules. Once the subset of data has been extracted, the ETL component may transform the extracted subset of data from the operational log into a format for another, target database, where the data format for the other, target database is different from a data format for the given, source database. The ETL component may then load the subset of data transformed into the data format for the other, target database into the target database.

17 Claims, 13 Drawing Sheets

```
{
    "_id"        :    ObjectId("4f3d3a78742dea88f"),
    "groupId"    :    ObjectId("4f3d3a78742dea88a"),
    "accoundId"  :    ObjectId("4f3d3a78742dea833"),     ----- 602
    "campaignId" :    ObjectId("4f3d3a78742dea32"), "firstPageCPC" : 0,  ----- 614
    "hidden" : false,
    "maxCPC" : 0.75,  ----- 615                        606

"metricSlot1" : {
            "calculated metric #261054" : 0,
            "calculated metric #261054" : 4,
            "calculated metric #261054" : 2,
            "calculated metric #261054" : 0,          ----- 604
  610       "calculated metric #261054" : 0,
            "calculated metric #261054" : 0.96,
              .
              .                                    608
            "clicks" : 1,
            "impressions" : 1,
            "cost" : 0.56,
            "revenue" : 3.50,

},

"metricSlot2" : {
            "calculated metric #261054" : 1.17,
            "calculated metric #261054" : 304,
            "calculated metric #261054" : 1.1,
            "calculated metric #261054" : 3,
  612       "calculated metric #261054" : 2.2,
            "orders" : 0,
            "clicks" : 1,
            "impressions" : 1,
            "cost" : 0.02,

}

"matchType" : "b",
    "name" : "Some random content",
    "partnerId" : 7,
    "partnerInstanceId" : 15921,
    "qualityScore" : 0,
    "status" : true,
    "scm_id" : 7661620,
    "searchEngineId" : NumberLong("3737372334"),
    "Destination URL" : "http://randomsite.com/lucero/rosalia/malena",
    "Geographic targeting" : "Austin, Texas, Earth"
}
```

*FIG. 6*

RULE-BASED EXTRACTION, TRANSFORMATION, AND LOADING OF DATA BETWEEN DISPARATE DATA SOURCES

BACKGROUND

A wide variety of applications allow a user to query and display report data, where the report data may be culled from multiple, sometimes disparate data sources. For example, if a user, through the use of a report generation tool, is interested in data such that the data is dependent upon both transactional and analytics data, a query to produce the data may be exceedingly slow because the necessary data is spread across multiple data stores and because the data stores may include massive amounts of data. In such a circumstance, if a user requests to see keywords for which more than 50 cents was bid on in the past week, and further where those keywords received at least 1000 clicks, the query necessary to satisfy such a request would be time and computationally intensive. However, it is often the case where a user is interested in data for certain, commonly requested time frames such as the previous week, or the previous two weeks, or the quarter to date, among other frequently specified date ranges. A further impediment to quickly satisfying a query that depends on both transactional and analytics data is that the structure of the stored data has different characteristics.

SUMMARY

In one embodiment, an extraction, transformation, and loading (ETL) component may access an operational log of a given database in order to detect an update to the given database. The ETL component may then, in response to detecting the update in the operational log of the given database, extract a subset of data from the operational log, where the extraction of the subset of data is based on one or more rules. Once the subset of data has been extracted, the ETL component may transform the extracted subset of data from the operational log into a format for another, target database, where the data format for the other, target database is different from a data format for the given, source database. The ETL component may then load the subset of data transformed into the data format for the target database into the target database.

BRIEF DESCRIPTION OF THE DRAWINGS

FIG. 6 depicts an embodiment of an example data object.

DETAILED DESCRIPTION OF EMBODIMENTS

Figure 1A:
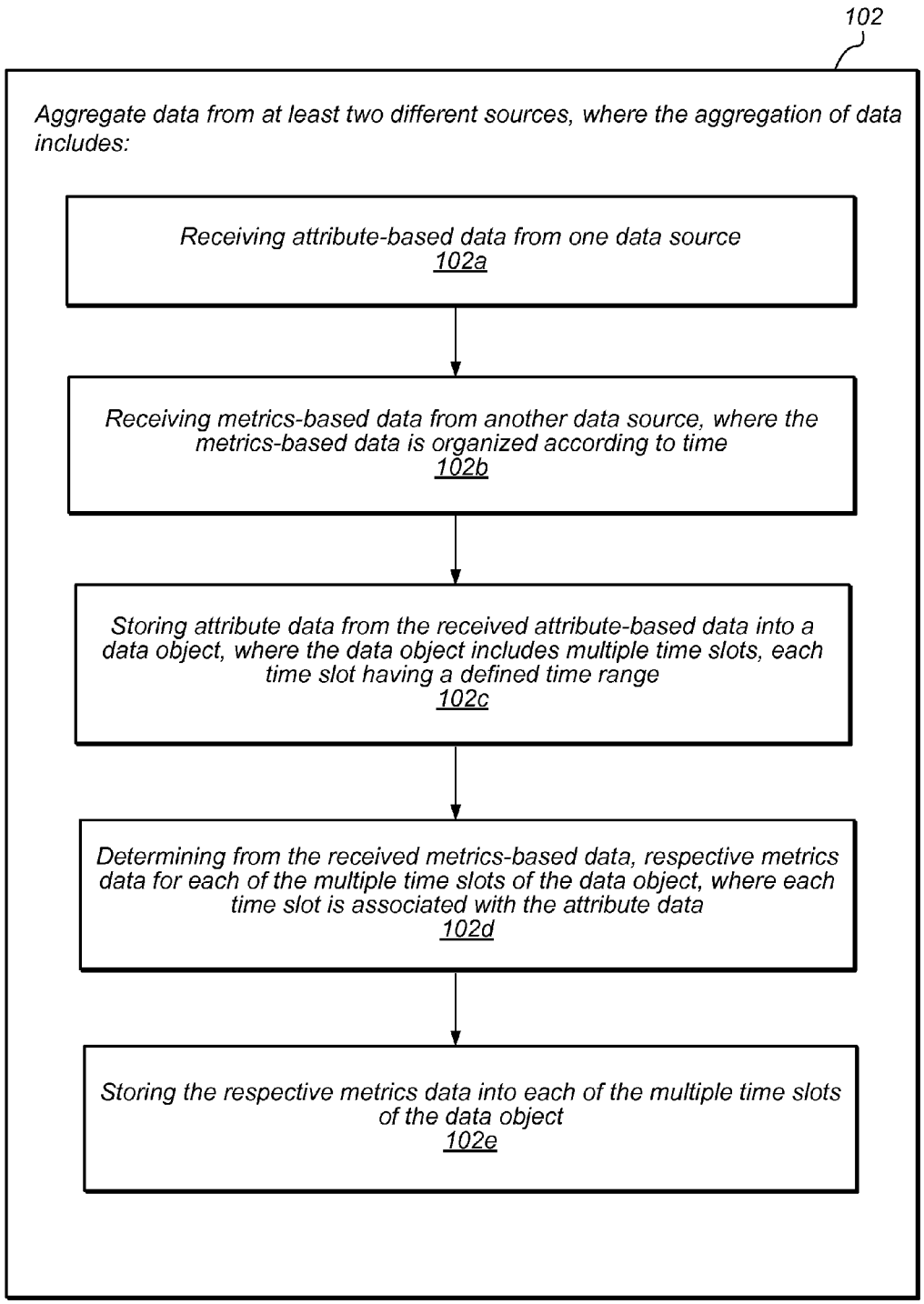
FIGS. 1A and 1B are flowcharts of embodiments of processing stages for an data aggregator aggregating data from multiple sources into a data object.

Various embodiments are presented for an data aggregator that may aggregate data from multiple disparate sources into an efficiently accessible format, and for an extraction, transformation, and loading component (ETL component) that may operate between at least two data stores and provide data for being aggregated.

For example, in the area of Internet marketing, transactional data generated through the use of search marketing tool may be stored in a transactional database. In some embodiments, the ETL component may extract data from an operational log of the transactional database, transform the extracted data, and load the extracted data into another database, for example a database onto which data is aggregated.

Often, when data from multiple data sources is moved to or aggregated at a different data store from the multiple data sources, the data formats at the different data stores may not be compatible. In such cases, to move data from one source to another, data may need to be transformed from one format to another. Further, in cases where a user is not interested in the entire content of the source data, a subset of data to be extracted may first need to be identified. Once the data has been identified and transformed, the data may then be loaded into a target data store.

Analytics data, collected from an analytics server may be stored in an analytics database. As noted above, if a user, through the use of a report generation tool for example, is interested in data such that the data is dependent upon both transactional and analytics data, a query to produce the data may be exceedingly slow because the necessary data is spread across multiple data stores and because the data stores may include massive amounts of data.

For example, if a user requests to see keywords for which more than 50 cents was bid on in the past week, and further where those keywords received at least 1000 clicks, the query necessary to satisfy such a request would be time and computationally intensive. However, it is often the case where a user is interested in data for certain, commonly requested time frames such as the previous week, or the previous two weeks, or the quarter to date, among other frequently specified date ranges. This pattern of data request behavior is a basis for an data aggregator to collect, prior to a request being made, data that would satisfy a query within a data object.

For example, metrics data stored within an analytics database is often associated with date ranges over which the metrics are collected, such as a number of conversions, or clicks, or some other metric as measured over a day, week, month, or some other period of time.

Further, analytics data may be associated with, for example, a hit on a content site, which may include the collection of multiple parameters such as a tracking code. In some embodiments, the tracking code may be used to resolve the analytics data corresponding to the tracking code with transactional data within a transactional database.

On the other hand, transactional data such as the kind generated when Internet marketing, such as search marketing, is performed, has a current state that the user may be interested in. Further, transactional data includes attributes. For example, for an ad or keyword, attributes may be how much a bid was with a certain search engine, how much a bid was for a different search engine, or a marketing campaign with which the ad or keyword is associated.

In some embodiments, an data aggregator may receive attribute-based data from a transactional database and metrics-based data from an analytics database. To aggregate the data into a common data object, the data object is structured based on the above described characteristics of the component data and based on the above described patterns of data access behavior such as commonly requested time periods for analytics data. Specifically, in some embodiments, the data object may store attribute data and corresponding analytics data such that the analytics data selected to be stored within the data object is based on one or more date ranges.

In other words, the data aggregator may store attribute data from the attribute-based data into a data object, where the data object includes multiple time slots corresponding to defined time ranges. The data aggregator may then determine from the metrics-based data, respective metrics data for each of the multiple time slots of the data object, where each time slot is associated with the attribute data. The data aggregator may store the respective metrics data into each of the multiple time slots of the data object. In this way, the data object may serve to efficiently provide an answer to a query requiring data from multiple data sources.

In some embodiments, the data object created by the data aggregator may be structured without schemas or tables, thus providing flexibility in how data from the multiple sources is organized within the data object. For example, the data object may be indexed according to an attribute of the attributed-based data, where the data aggregator may create a hierarchical structure to the data object through the nesting of different time slots, or buckets, within which metrics data corresponding to the time slot is stored. The lack of any schemas allows the data aggregator the flexibility to define a data object according to such a hierarchically nested structure as required, and supporting ad hoc buckets in some embodiments.

More generally, in some embodiments, the data aggregator may create data objects within a database that does not adhere to the relational database management system model. In other words, where data is not stored primarily within tables, and where a standard query language (SQL) would not apply, and JOIN operations would not be usable. In using key-value indexing, data retrieval of large quantities of data that do not require a relational model may be highly optimized. Given this flexibility, the data aggregator may structure data objects to quickly satisfy queries that correspond to the structure of the data objects.

In some embodiments, the data aggregator may receive data for aggregating from another type of data source, and the schedule on which accesses are based may depend on the type or format or source of the data. In the case of analytics data, the data aggregator may access or receive daily updates of analytics data from an analytics database or analytics server.

In addition to storing raw analytics data, the data aggregator may also store calculated analytics data values. For example, in the case the time slot is the past week, analytics data for clicks for each of the past seven days may be stored in addition to a field corresponding to a calculation based on the raw analytics data, for example, average clicks for the week. For the calculated values, the metrics data for the oldest day being replaced may be used to adjust the calculation one way, and the metrics data for the newest day may be used to adjust the calculation the other way. For example, if the calculated value of a metric is total clicks, the clicks for the oldest day may be subtracted and the clicks for the newest day may be added, resulting in an updated calculated total number of clicks for the past week.

In the case of analytics data, a daily accesses of analytics data are preferred by many users because real-time analytics data may not be as complete, reliable, or useful as the analytics data for the previous entire day.

In some embodiments, when a date range for a given time slot of a data object is updated with new analytics data for the previous day, the metrics data for the oldest day of the time slot may be subject to being decremented by the metrics values of that oldest day and then incremented with the metrics values for the previous day.

In some embodiments, in the case of transactional data, the data aggregator may receive real-time, near real-time, or runtime updates from the ETL component. In some cases, a transactional database may update an operational log as the database receives and stores data within the transactional database. In this example, an ETL component may access the operational log to detect an update to the operational log. The ETL component may also, in response to detecting the update to the operational log of the transactional database, extract a subset of data from the operational log, where the extraction of the subset of data is based one or more rules.

In some embodiments, updates to the operational log are deltas from previous updates. However, in the case of aggregating data into a data object and storing attribute-based data within the data object, the data object may be updated based on a delta value. In this case, it is sufficient that the data extracted is simply a delta value from a previous update. For example, say a campaign account within a transactional database has x campaigns, and a data object which includes attribute data for the campaign account stores the number of campaigns, x. In this case, a rule may be that whenever a campaign is added or deleted, the number of campaigns is to be correspondingly modified. In this way, a modified count of campaigns serves as the update to the data object when the ETL component loads data into the Aggregation Data store 206.

In cases where the transaction database is an RDBMS, the ETL component extraction does not access any database tables from the transaction database. In some cases, the format of the accessed data needs to be modified to be compatible with the format of the aggregation database, and in such cases, the ETL component may transform the extracted subset of data from the operational log into a data format for another database. In some cases, the data format of the transaction database may be the same from the data format for the aggregation database. Once the ETL component has extracted the subset of data, the ETL component may load the subset of transformed data into the data format for the aggregation database.

In some embodiments, the functionality of the ETL component may be incorporated into the functionality of the data aggregator, where the data aggregator may execute on the aggregation database and remotely access the operational log. In some embodiments, when the functionality of the ETL component is incorporated into the data aggregator, the data aggregator may communicate with a process, such as a listening process, executing on the transactional database.

In some embodiments, the aggregation of data depends on the characteristics of the data being aggregated. Further, in different embodiments, different types of data objects corresponding to or storing the aggregated data may be defined. For example, a data object may be defined such that the data object is indexed or located through an attribute key, where the attribute key may be a transactional data element, as depicted in FIG. 6. In this example, the data object may have a configurable number of date range slots, where different ranges may be made available to different users. In some cases, a user may specify an ad hoc, or custom date range after the data object has been created and populated with data. In such a case, if a data object has been defined with a fixed number of time slots, a time slot dedicated to ad hoc date ranges may be used for the custom date range. In other cases, where a data object may hold any number of time slots, limited only by available memory, the data object may be updated to specify an additional time slot in accord with the custom date range specified.

In each of the various embodiments of a data object, the date range slots may be defined to hold data corresponding to any selection of times, including non-contiguous date ranges. In other embodiments, the data aggregator may aggregate the data into any type of data structure that may be indexed according to a key value and where the data structure may store one or more nested ranges of values.

In some embodiments, the data aggregator may identify a data object according to multiple indexes. For example, transactional data may include attributes for a keyword, an ad, a group that includes certain keywords or ads, or campaigns. Correspondingly, the analytics data may be rolled up according to each of these transactional attributes across a given time range and stored within the data object.

As noted above, one reason to organize analytics data according to date ranges is because that is how analytics data is usually queried when generating metrics reports. However, in some cases, where data from another type of data store is organized differently, the data aggregator may correspondingly define slots within which to store the other type of data in accord with how the other type of data is organized.

In some embodiments, in generating a report using the data, the parameters of the query, or the parameters of the most common types of queries to the database holding the data may be used in defining the scope of one or more of the slots of the aggregated data object.

In some embodiments, the type of data stored within the segments, buckets, or slots of the data object may be used to define segments, buckets, or slots representative of delta values between other segments, buckets, or slots. For example, a data object may have three slots, one for the past week, one for the week before the past week, and a delta between the two weeks of the first two slots. In this example, say the analytics data includes numbers of clicks on an ad, where the number of clicks in the past week is 10,000, and the number of clicks on the add for the week before the past week is 15,000. In this case, the delta slot may hold the value of 10,000-15,000, or −5,000, indicating a drop-off of 5,000 clicks on the add from the previous week to the current week. In some cases, the delta may be measured as a percentage, or according to some other measure. Using delta slots allows for queries such as a request for keywords with over 1,000 clicks in the last week, but that has a negative delta from the week before that. In other cases, a dedicated slot may be more complicated than a delta, and may correspond to any given formula or calculation.

In some embodiments, a dedicated delta slot is not necessary to answer such a query, and the data aggregator may calculate the necessary value when the query is received. However, in the case where the slot holds the answer, the data aggregator avoids having to perform a calculation in generating a response to the query. Further, delta slots or formula slots occupy very little memory space, and because queries often include parameters specifying trending information, delta or formula slots may allow for great speed optimization.

In some embodiments, the data aggregator may not have a slot or range of data that corresponds to data to satisfy a query. However, it may be the case that the data aggregator may use existing data stored within a data object to satisfy the query. For example, say a data object has a slot for storing analytics data for a keyword for the most recent week and another slot for storing analytics data for the keyword for the week before the most recent week. In this example, say the user submits a query where analytics data for the previous two weeks is necessary to satisfy the query. In this case, while there may be no pre-defined slot that matches the date range of the previous two weeks, all of the analytics data necessary to satisfy the query is stored within the data object. In this case, the data aggregator may use the analytics data within the slot for the previous week in addition to the time slot for the week before the previous week.

In some embodiments, the data aggregator may also use a subset of analytics data that may be determined across multiple slots of the data object. For example, if the query specified a date range of the past 9 days, the data aggregator may use the analytics data stored within the slots for the previous week and the analytics data for the slot for the week prior to the previous week. Once the data aggregator has extracted the data from the appropriate slots, the data aggregator may generate a response to the query.

In the following detailed description, numerous details are set forth to provide a thorough understanding of the claimed subject matter. However, it will be understood by those skilled in the art that the claimed subject matter may be practiced without these specific details. In other instances, methods, apparatus or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment

Data Aggregator

Figure 2:
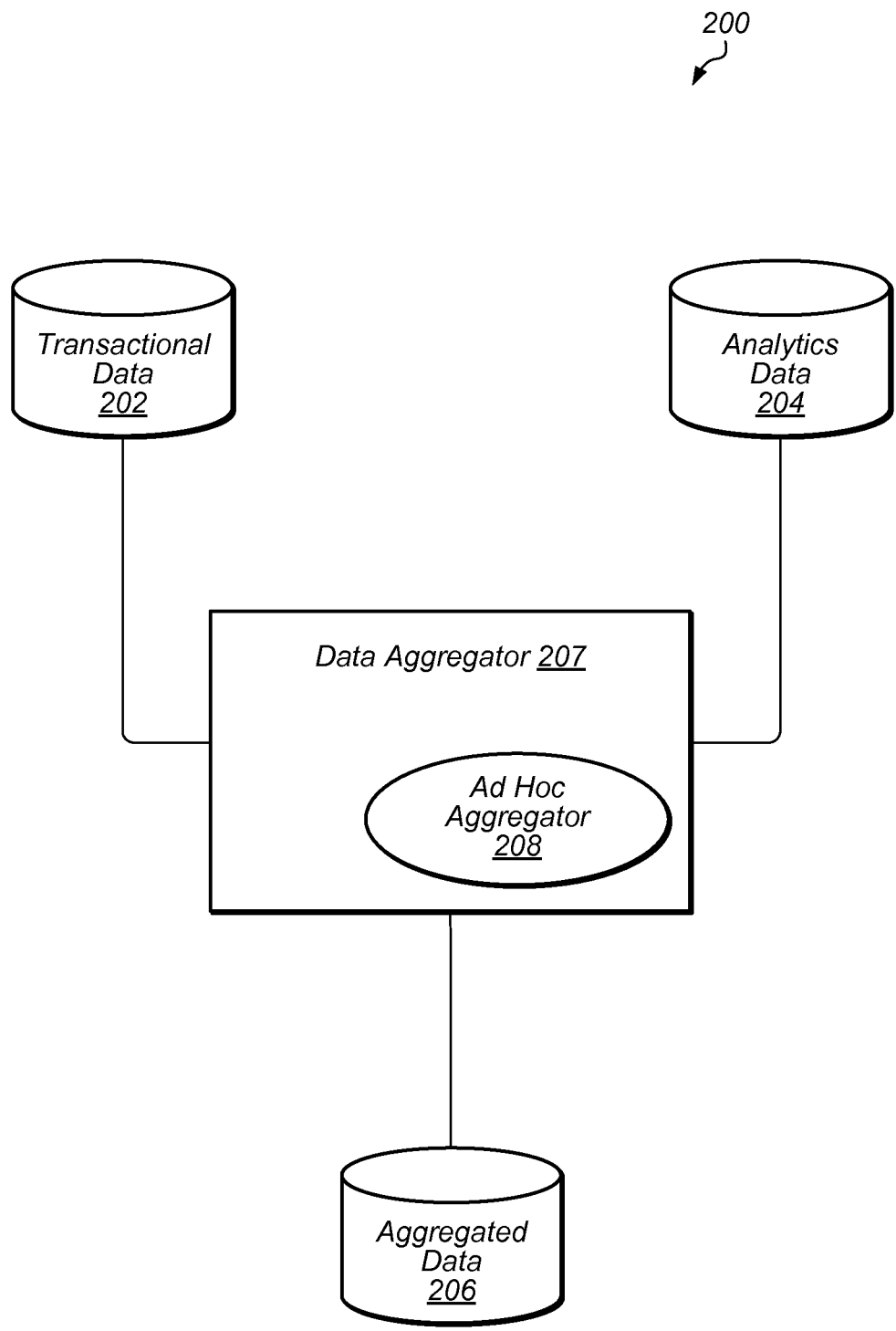
FIG. 2 depicts an illustration of several data sources and a data store in which aggregated data stores data objects, according to some embodiments.

FIG. 1A illustrates a flowchart highlighting example processing stages that may be present in an embodiment of an data aggregator, such as data aggregator 207 in FIG. 2. As discussed above, the data aggregator may aggregate data from at least two different sources, as indicated within stage 102 and as depicted within FIG. 2.

For example, in the case of aggregating attribute-based transaction data and metrics-based analytics data, the data aggregator may receive data from one or more databases storing the attribute-based data and one or more databases storing the metrics-based data. In other embodiments, the data aggregator may aggregate more than two types of data.

In this example, and as depicted according to system 200, one data source is attribute-based data stored within Transactional Data store 202 of FIG. 2, and another data source is metrics-based data stored within Analytics Data store 204. In some embodiments, the Analytics Data store 204 may be updated by Analytics Server 806, either directly, or over a network such as network 802, as depicted within FIG. 8.

As depicted in FIG. 2, both Transactional Data store 202 and Analytics Data store 204 are coupled to Aggregated Data store 206, which is where the data aggregator creates and stores the data objects including the aggregated data.

As reflected in stage 102*a*, the aggregation of data includes receiving attribute-based data from one data source, and as reflected in stage 102*b*, metrics-based data is received from another data source, where the metrics-based data is organized according to time.

Upon receiving the data to be stored within a data object, the data aggregator may then store attribute data from the received attribute-based data into the data object, where the data object includes multiple time slots, and where each of the multiple time slots is defined according to a time range, as reflected in stage 102*c*. In some cases, the time range may not be a contiguous span, but rather a collection of one or more time periods, such as the previous four weekends, or the weekdays of the last month.

In storing the metrics-based data, the data aggregator may determine from the received metrics-based data, respective metrics data for each of the multiple time slots of the data object, where each time slot is associated with the attribute data, as reflected in stage 102*d*.

Once the determination of respective metrics data has been made, the data aggregator may store the respective metrics data into each of the multiple time slots of the data object, as reflected in stage 102*e*. In this way, a single data object may be either created initially or updated with new data.

Further, the data aggregator may repeat this process of creating or updating data objects for any number of data objects, where the creation or update of subsequent data objects includes the processing stages of 102*a* through 102*e*.

Figure 5:
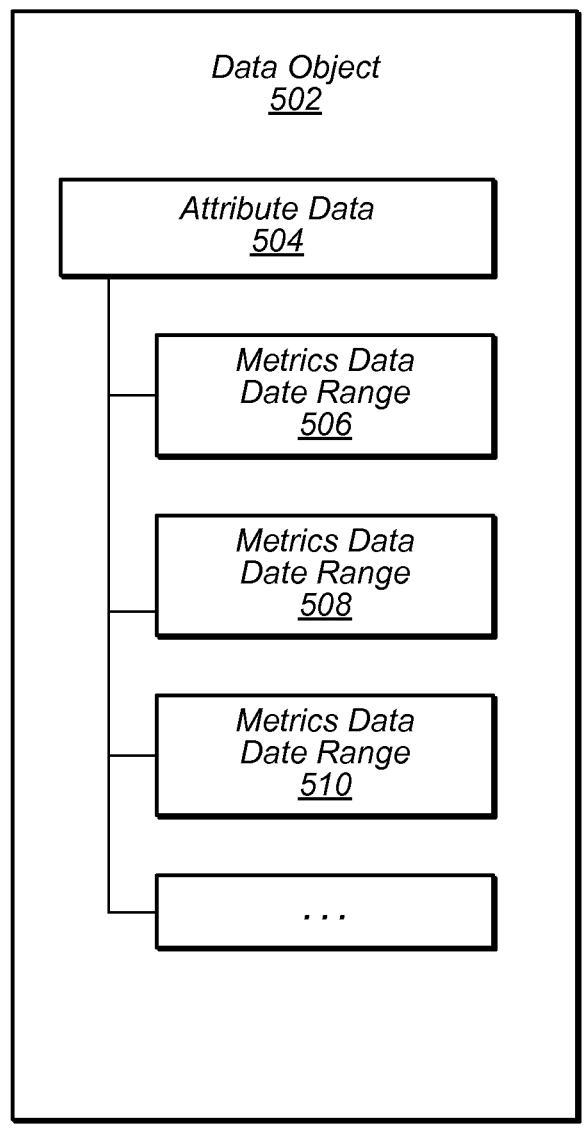
FIG. 5 depicts an illustration of an example data object structure including transactional data and analytics data for initially configured date ranges.

In some embodiments, a data object may be structured according to the elements of Data Object 502 in FIG. 5. In this example, the respective metrics data may be stored within the multiple time slots depicted as Metrics Data Date Range 506, Metrics Data Date Range 508, Metrics Data Date Range 510, among other possible time slots. Further, in this example, the attribute data from the received attribute-based data may be Attribute Data 504 of Data Object 502.

As noted above, the structure of a data object may take may forms and may be implemented in a variety of data structures. As one example, FIG. 6 depicts a data object 600, which in some cases may be stored in a document within a file system. As depicted by surrounding box 602, the data object may include multiple identification values that are references to, say, a keyword. These identification values in additional to attribute data are at the same hierarchical level, as indicated in this example with nesting within a curly bracket.

The data object may further include attribute data such as "firstPageCPC" 614, which refers to cost-per-click for a first page of say, a website home page, and "maxCPC" 615, or maximum cost-per-click. In this example, the values for each of the attributes is next to the attribute separated with a colon, where attributes are separated with commas. However, the syntax is unrelated to the functionality or the nested structure of the data object.

Further in this example, "metricSlot1" 610 and "metricSlot2" 612 represent time slots, or bins, or buckets into which a slice of analytics data may be stored, where the slice corresponds to a particular date range. The analytics data within a given time slot may be raw analytics data such as "revenue" 608, which in this example corresponds to a value of 3.50. The analytics data within a given time slot may also be a calculation based on the analytics data, such as "calculated metric" 606. As discussed above, the calculation may be any formula or calculation applied to analytics data within the particular time slot.

Example Embodiment

Ad Hoc Creation of Slots Within a Data Object

Figure 1B:
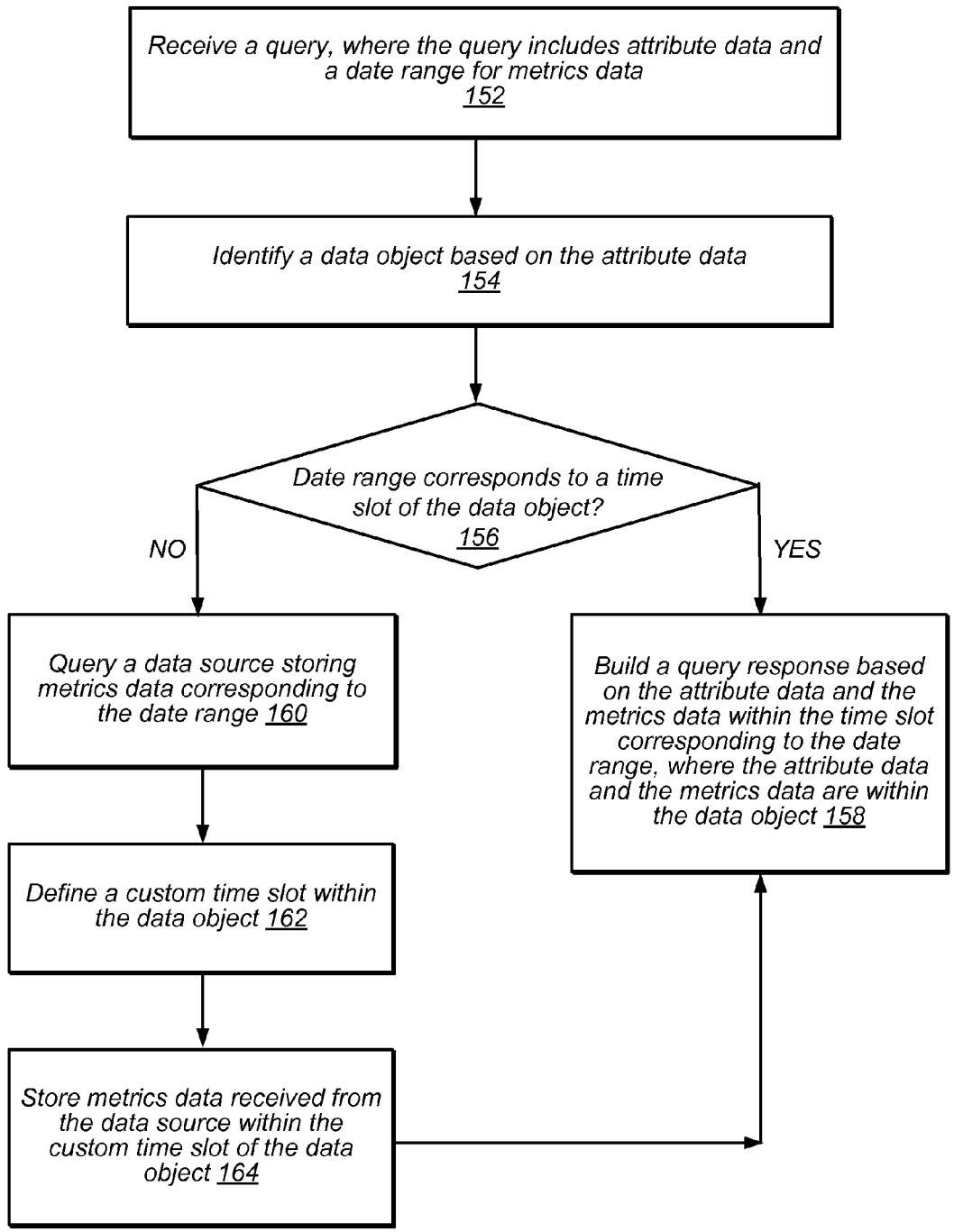
Figure 1C:
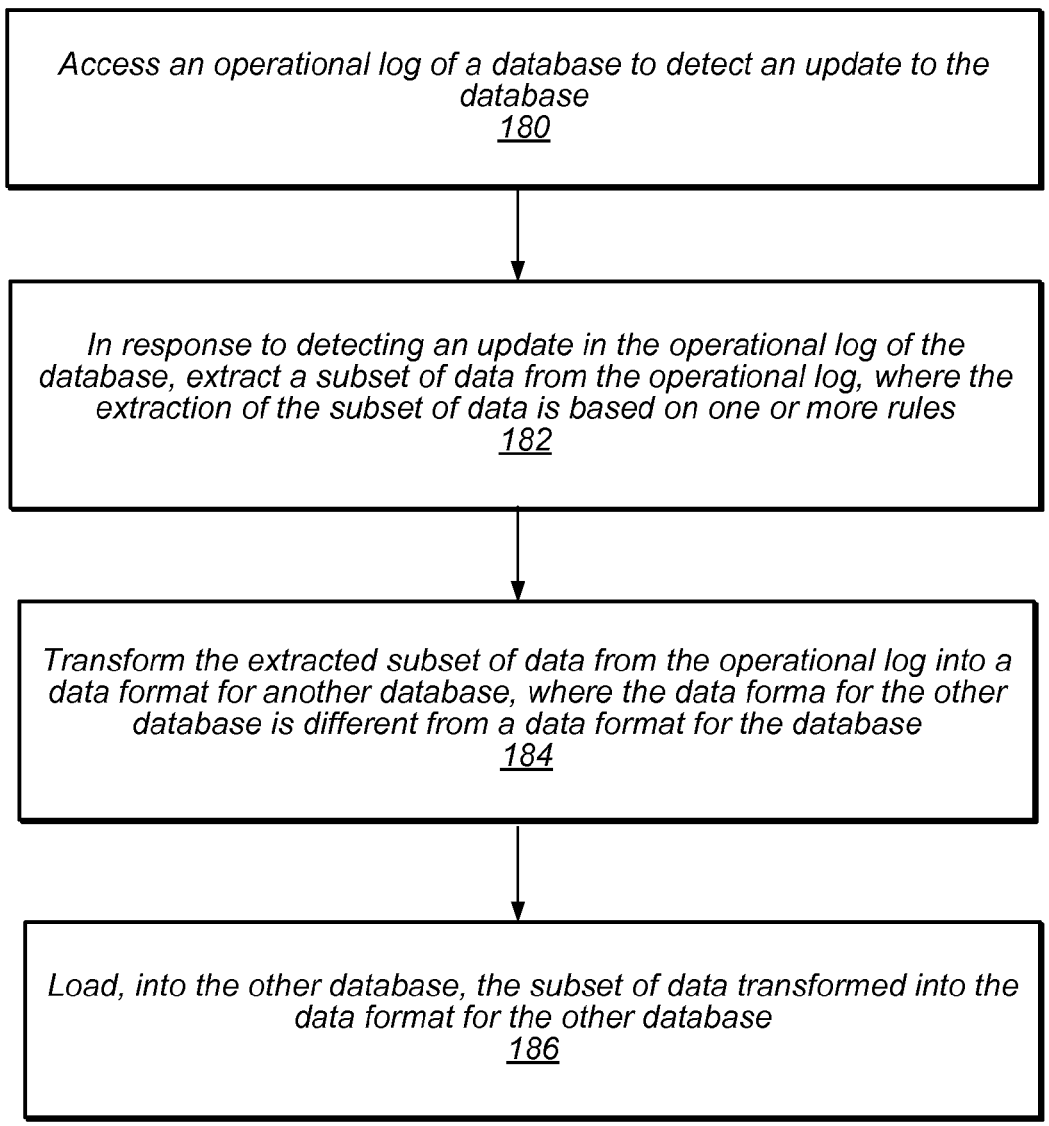
FIG. 1C is a flowchart of an embodiment of processing stages for an extraction, transformation, and loading component.

FIG. 1B illustrates a flowchart highlighting example processing stages that may be present in an embodiment of an data aggregator in the case where a data object is updated to include a new time slot.

Figure 7:
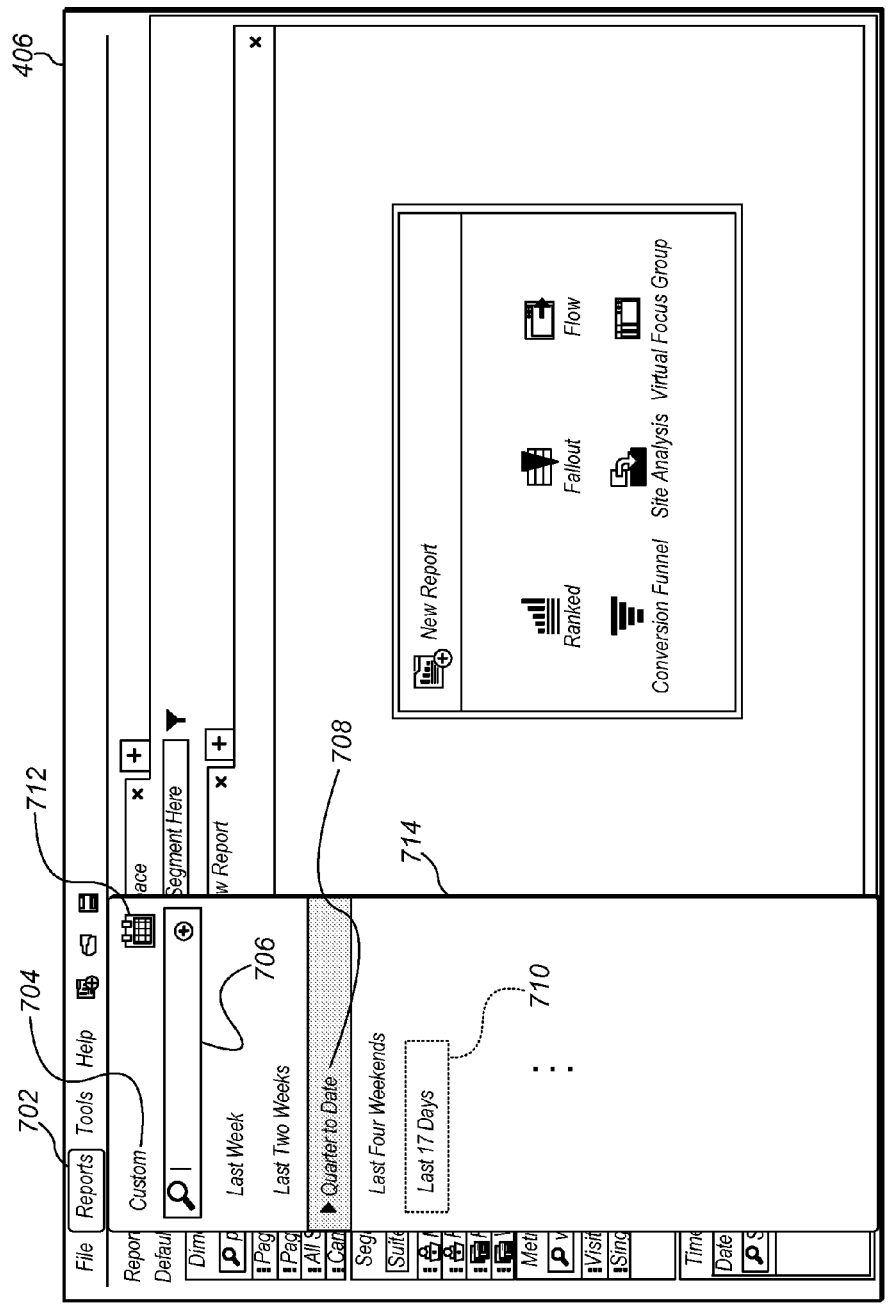
FIG. 7 depicts an illustration of a user interface through which a user may enter a query drawing from both transactional and analytics data, according to some embodiments.

As discussed above, when a data object exists that holds data sufficient to satisfy a query, a query response may be generated quickly, in most cases under a second. For example, a user may select, through a user interface such as User Interface 406 within FIGS. 4 and 7, parameters for a query beginning with a selection of a Reports 702 drop down menu.

In this example, the user may specify attribute parameters within text box 706, and the user may also specify a date range that has been determined prior to the user beginning the construction of the query. Specifically, in this example, the user may select "Quarter to Date" 708 as the date range for the query, where the selection is indicated with a shaded box and an arrow.

As discussed above, the data aggregator may operate to aggregate data from more than two data sources. In such cases, the drop down menu may be defined to include multiple selectable pre-defined parameters that may correspond to pre-defined slots within a data object, where the variable parameter value may serve as the index to identify the data object, and where the selectable parameters correspond to fixed parameters according to which the slots within the data object may have been defined and populated with data from the multiple sources of data. In such cases, the nesting depicted within FIG. 5, may extend to additional levels corresponding to the types of data from each of the multiple data sources.

In this example, where a user selected a pre-defined date range, corresponds to the examples above in regard to FIG. 1A, where the aggregation of data, depicted in stages 102 and 102a-102e, may begin once the date ranges, seen in the drop down menu, are defined.

However, it may be the case that time slots used to create the data object do not satisfy a user query, and in such a case, the data aggregator may create a new slot to store the data to satisfy the query. In this case, a user may either first create a new custom date range, after which the user may then enter a query specifying the new custom date range, or a user may specify a custom date range at the time the query parameters are specified. In either case, there may be an initial delay while data corresponding to the date range is extracted and stored in the appropriate data object before a query using the new date range may be satisfied.

When specifying a custom date range, a user may use a date range specification option presented in drop down menu 714, where a user may select either Custom 704 or Calendar 712 in order to define a custom, or ad hoc, date range. In the case where a user specifies a custom date range prior to a query, once the date range has been specified and the data object updated, the date range may appear within drop down menu 714 as an option for a query.

Further in this example, while the initial query may be delayed because the data aggregator needs to query the source database or databases, subsequent queries using the same parameters may be answered quickly. As depicted by date range 710 of FIG. 7, a custom date range of the last 17 days may be available to a user once the data aggregator has created the custom time slot within the date object and stored the respective analytics data within the custom time slot.

In this example, as in the discussion above in regard to FIG. 1A, an Aggregated Data store 206 may be coupled to both a Transactional Data store 202 and an Analytics Data store 204. Further, as depicted in FIG. 2, an Ad Hoc Aggregator 208 may be a component within data aggregator 207, and as depicted by Ad Hoc Aggregator Module 914 within FIG. 9A. In some embodiments, the data aggregator, including the ad hoc aggregator, may be implemented within a system incorporating Aggregated Data store 206.

As reflected in stage 152, an data aggregator receives a query where the query includes parameters for attribute data and parameters for a date range for metrics data. In this example, the data object corresponding to the attribute data already exists.

The data aggregator may then identify the existing data object based on the attribute date from the query, as reflected in stage 154. In this example, the date range parameter of the query does not correspond to an existing time slot within the data object, as determined at stage 156. Therefore, in this example, processing continues at stage 160, where the data aggregator queries the data source storing the metrics data corresponding to the date range in the received query parameters.

Upon receiving a response to the query from the data source storing the metrics data, the data aggregator may define a custom date slot within the data object, as reflected in stage 162.

Figure 3:
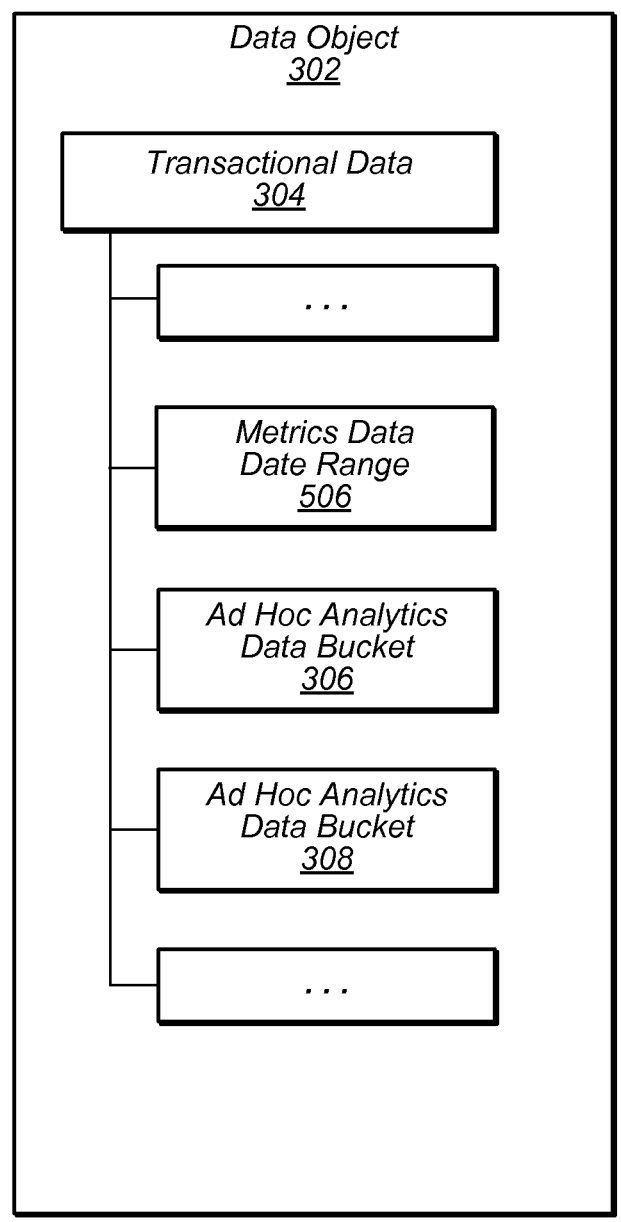
FIG. 3 depicts an illustration of an example data object structure including transactional data and analytics data for a custom date range.

In some embodiments, a data object used in the creation of ad hoc time slots may be structured according to the elements of Data Object 302 in FIG. 3. For example, at stage 162, the data aggregator may create Ad Hoc Analytics Data Bucket 306 within Data Object 302, as depicted in FIG. 3. Ad Hoc Analytics Data Bucket 308 may be created in response to a subsequent query using a time range parameter that does not correspond to an existing time slot within the data object. In some example, there may be a fixed number of time slots reserved for ad hoc or custom date ranges for analytics data, and in such a case, the data aggregator may recycle time slots according to any number of different methods. For example, given three ad hoc time slots, where each is being used, the data aggregator may recycle the time slot that has been least frequently used, or least recently used, or the data aggregator may apply a round robin approach, or some other approach.

Given the new custom date slot, the data aggregator may store the metrics data received from the data source for metrics data within the custom time slot of the data object, as reflected in stage 164.

Once the metrics data required to satisfy the initial query is stored within the data object, processing may continue at stage 158, which is where processing continues when at stage 156 the data aggregator determines that the data object includes a time slot for the date range of the initial query. At stage 158, the data aggregator may use the data object to build a query response based on the attribute data and on the metrics data within the time slot corresponding to the date range.

Example Embodiment

ETL Component

Figure 4:
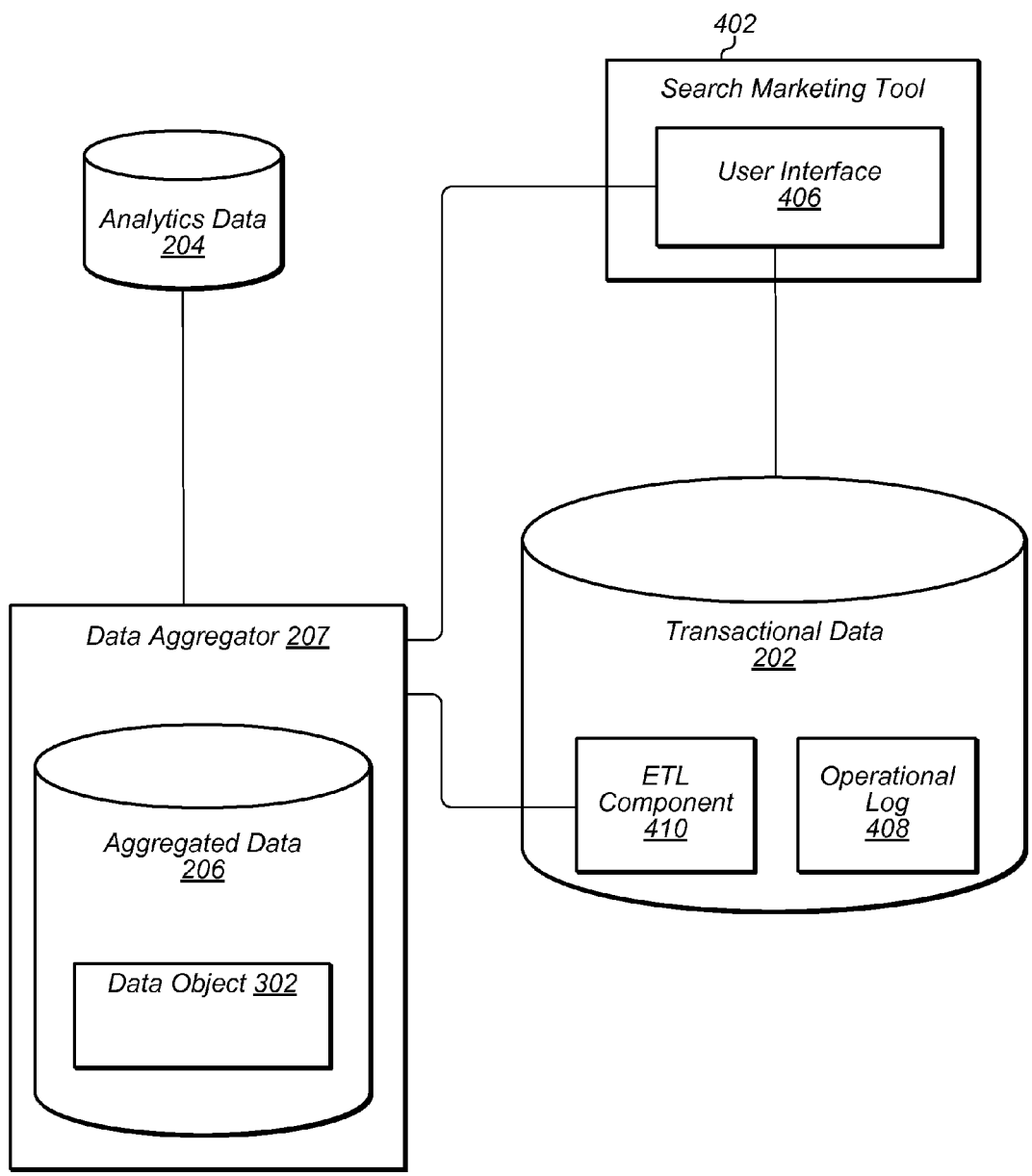
FIG. 4 depicts an illustration of an analytics data store, a transactional data store, an aggregated data store, and a user interface for a computer system coupled to the transactional data store and the aggregated data store, according to some embodiments.
Figure 8:
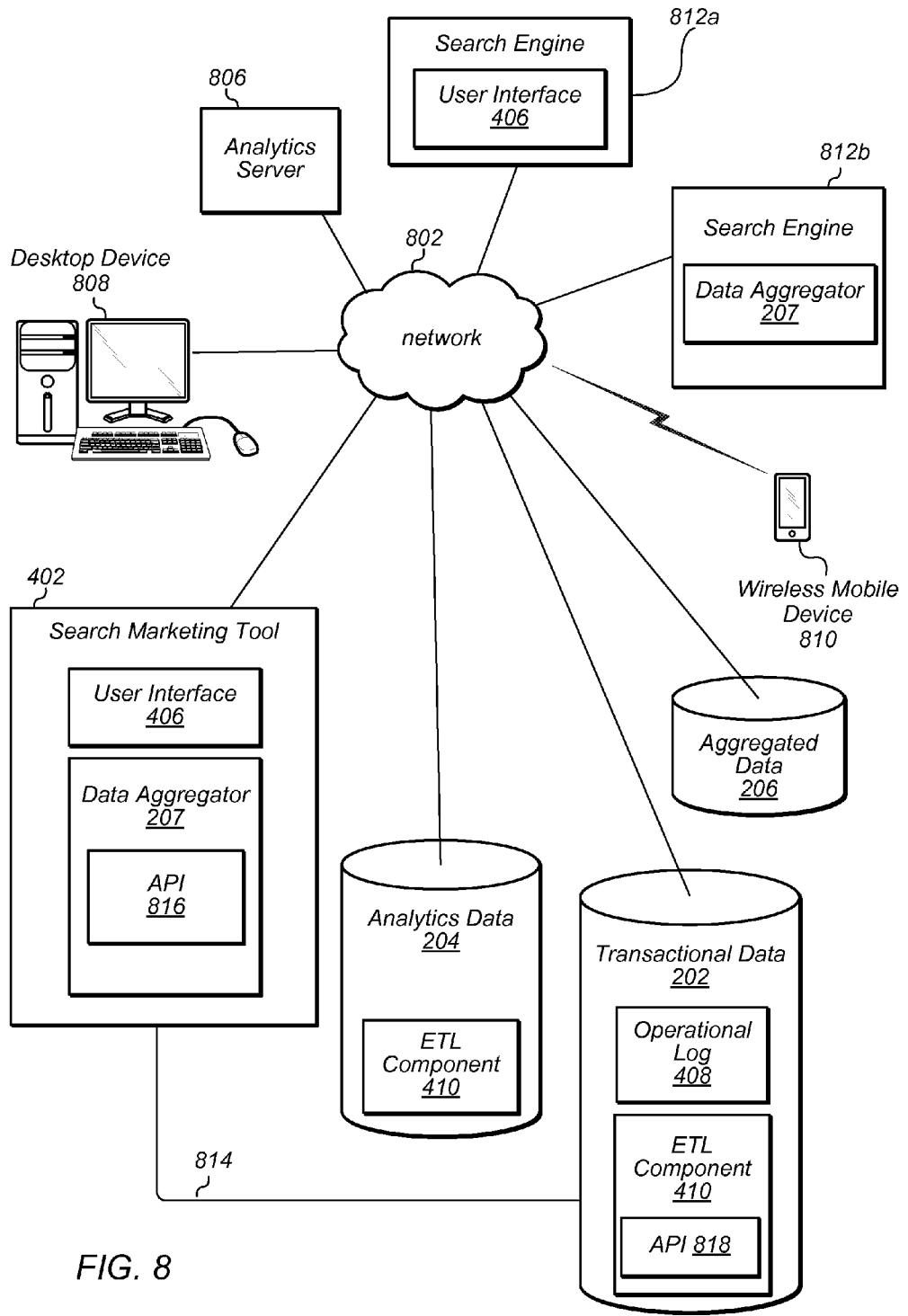
FIG. 8 depicts elements of an example computer network capable of supporting an data aggregator.

FIGS. 2, 4, and 8 illustrate different system configurations where an ETL component may operate between at least two different databases. In these examples, the ETL component may operate between Transactional Data store 202 and Aggregated Data store 206.

FIG. 4, for example, illustrates transactional data 202 that may serve as the source data, and where an aggregated data store 206 is the target. Further, User Interface 406 may serve as the source of any transactional data updates. For example, User Interface 406 may be implemented within Search Marketing Tool 402. Search Marketing Tool 402 may provide a user with User Interface 406 to allow a user to bid on keywords, or to create and manage marketing campaigns. The Search Marketing Tool 402 and User Interface may execute on or be accessible to user through, for example, a Desktop Device 808 or a Wireless Mobile Device 810 in FIG. 8. For example, a user may, through a given device, log on to a server or system on which the Search Marketing Tool 402 is executing.

In some embodiments, transactional data may be provided based on interactions with one or more search engines, for example, Search Engines 812a and 812b. In some embodiments, transactional data may be provided from one or more of Search Engines 812a and 812b. In some embodiments, User Interface 406 or Search Marketing Tool 402 may be implemented within either of Search Engines 812a or 812b.

In other embodiments, the source data may be distributed across multiple different databases, where the ETL component would extract data from each of the distributed database sources of transactional data.

As described above, the ETL component may operate independently or as part of an data aggregator. In a case where the ETL component may operate independently, the ETL component, such as ETL Component 410, may operate within a system including Transactional Data store 202 and the ETL component may communicate over a network, as depicted within FIG. 8, or over a communication link with the database which is to be provided with the extracted data, as depicted within FIG. 4.

In this example, the ETL component may access operational log 408 of Transactional Data store 202 to detect an update to the database, as reflected in stage 180. Transactional databases in this example may be relational databases with data stored within tables and organized by schemas or the transactional database may be a schema-less database. In either case, the ETL component detects updates to an operational log, which is independent of updates in the database to the tables or structures into which data is written. In other words, access of the operational log does not include accessing tables or data structures within the database. In some embodiments, avoiding the use indexes to access data stored within the database allows for improved performance of the ETL component.

In some embodiments, detection of an update to an operational log may be performed in different manners. For example, the ETL component may periodically or aperiodically poll the operational log to determine if any updates have occurred since the previous polling. In other cases, the ETL may communicate or implement a listening process that is triggered when the operational log is modified or updated.

In either case, once the ETL component has detected an update to the operational log of the database, the ETL component extracts a subset of data from the operational log, where the extraction of the subset of data is based on one or more rules, as reflected in stage 182. As noted above, the one or more rules may be user-configurable, and the rules may be defined to identify and extract specific types of data or updates to particular attributes of the transactional data. In some cases, User Interface 406 may provide an interface through with a user may define or configure rules that may be accessed by the ETL component. In general, the rule may be any simple or complex set of instructions and/or logic that serves to specifically identify the updates or modifications of interest to a user. Further, the one or more rules may be designed to identify attribute-based data in accord with attribute data used for indexing into a data object storing an aggregation of data from multiple, disparate sources. In other words, the rules may be configured to be based on the structure of a data object on Aggregation Data store 206 such that the rules identify data that is to be stored within the data object.

As reflected in stage 184, the ETL component may transform the extracted subset of data from the operational log into a data format for another database, where the data format for the other database is different from a data format for the database of the operational log. In this example, the other database, the target database, is the Aggregated Data store 202. Further, in this example, the ETL component may transform the subset of extracted data into a format suitable for creation of the data objects discussed above.

Once the extracted subset of data has been transformed, the ETL component may load the subset of data into the other database, in this case the Aggregated Data store 202, where the subset of data has already been transformed into the data format for the Aggregated Data store 202. This loading process is reflected in stage 186.

Further, because the ETL component may detect an update to an operational log as soon as the operational log is updated, the ETL may accomplish the entire extraction, transformation, and loading elements in real-time, or at least near real-time. Further still, because the ETL component does not access the tables or data structures into which database updates are written and stored, the ETL component does not compete with other processes that may be accessing the database and the ETL component does not compete with subsequent updates to the database.

Data Aggregator Module

Figure 9A:
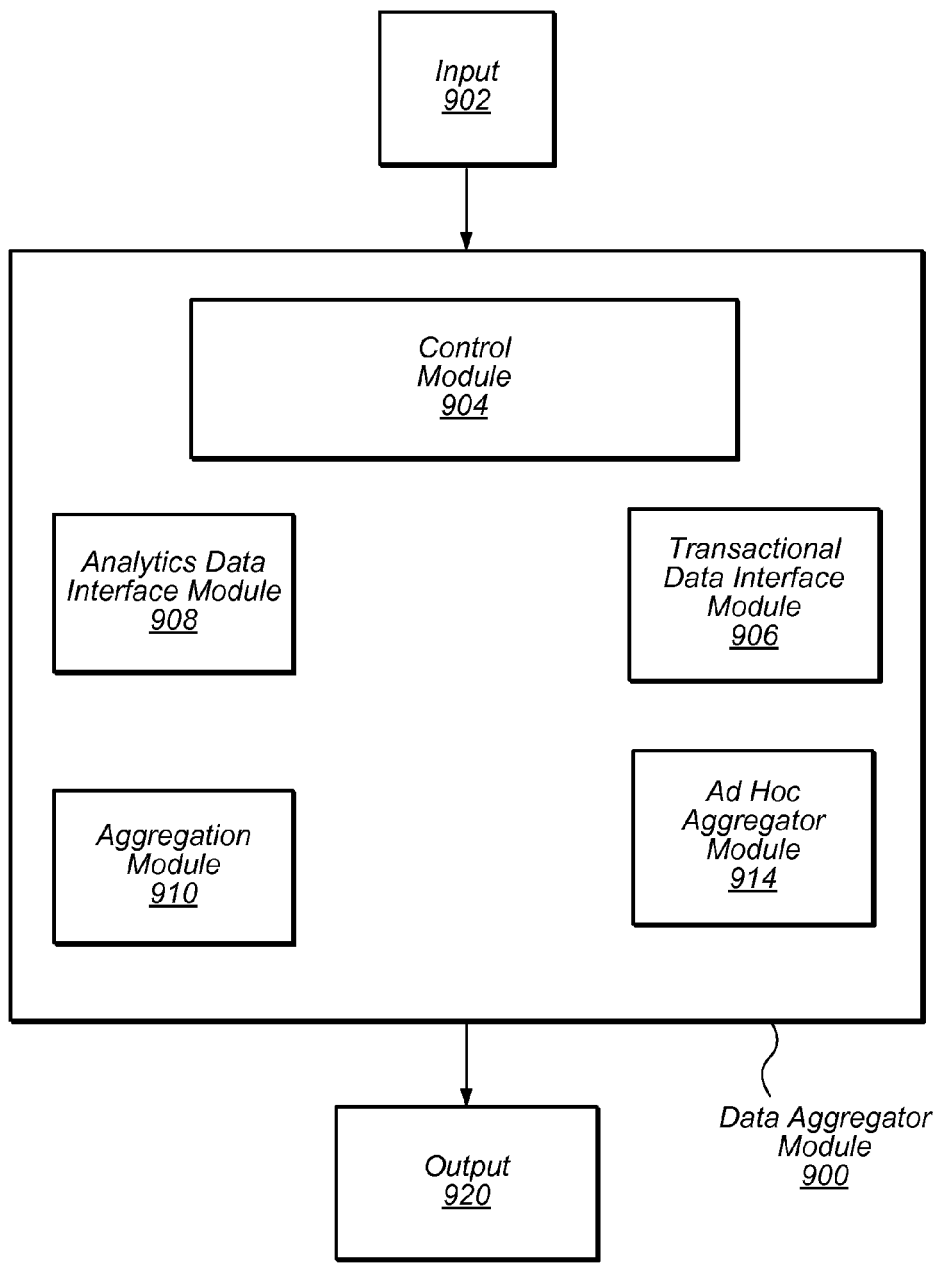
FIGS. 9A and 9B depict elements of an data aggregator module and an extraction, transformation, and loading component module, according to some embodiments.

FIG. 9A illustrates an embodiment of an Data Aggregator Module 900. Data Aggregator Module 900 may be implemented in a variety of different embodiments, including each of the embodiments described herein.

In some embodiments, Control Module 904 may receive Input 902, which may be various types of queries or data from other data stores. Depending on the input, Control Module 904 may create a data object, update a data object, or query a data object.

In some embodiments, when the Aggregator Module 900 is creating a new, ad hoc date range within a data object, the Aggregator Module 900 may query an analytics data store to retrieve the metrics data that is to be stored within the new date range slot of the data object. In such a case, Analytics Data Interface Module 908 may query an analytics data store to retrieve analytics data for storing within the new date range slot, and the retrieved analytics data may be Input 902.

In this example, Control Module 904 may invoke Ad Hoc Aggregator Module 914 to create a new slot within the data object, or to redefine an existing slot dedicated to ad hoc slots within the data object.

In some embodiments, Transactional Data Interface Module 906 may interface with or communicate with a transactional data store, or any other type of data store to receive transactional data or the type of data corresponding to the any other type of data store. For example, Transactional Data Interface Module 906 may communicate with ETL component 410 within Transactional Data store 202.

Given data from the multiple sources coupled to the Data Aggregator Module 900, Aggregation Module 910 may either create or update a data object with an aggregation of the data from the multiple sources of data, as discussed in the various embodiments above.

Output 920 may be data satisfying a query response based on aggregated data within a data object.

In some embodiment, Data aggregator Module 900 may include each of the elements of ETL component Module 950, and may correspondingly implement the features and functionality of the various ETL component embodiments discussed herein.

ETL Component Module

Figure 9B:
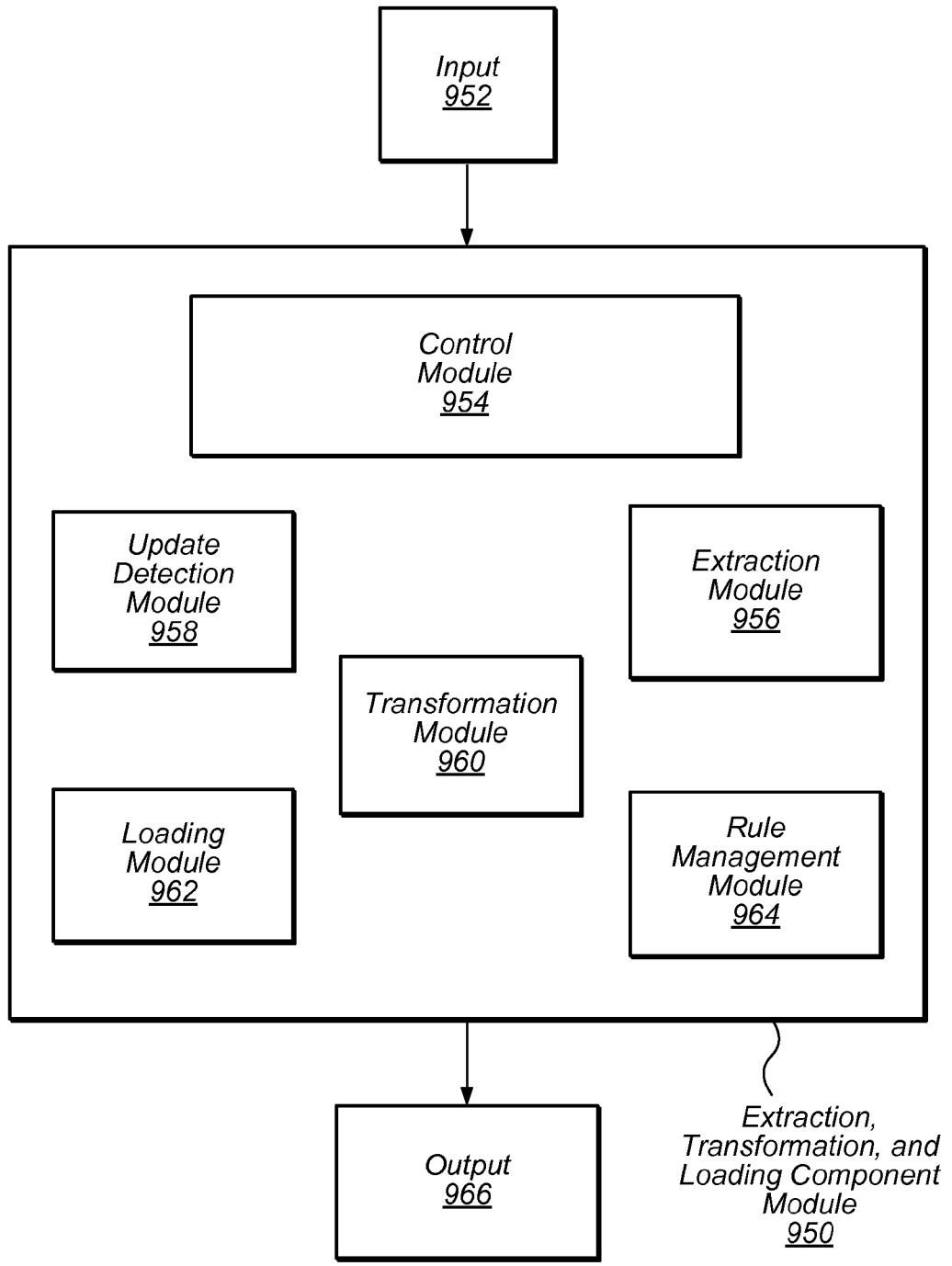

FIG. 9B illustrates an embodiment of an ETL component Module 950. ETL component Module 950 may be implemented in a variety of different embodiments, including each of the embodiments described herein.

In some embodiments, Control Module 954 may receive Input 952, which may be a notification that an operational log has been updated or the updated data added to the operational log. Depending on the input, Control Module 954 may use received update data or access the operational log to read the updated data.

In some embodiments, Update Detection Module 958 may actively determine when an update to the operational log has occurred. For example, through the implementation of a listening process that detects when the operational log is updated or that may be notified when an update to the operational log is performed.

Given update data, Extraction Module 956 may apply one or more rules to determine the content of the extraction based on the rules and on the updated data. The rules may be simple identifications of a particular attribute value update, or the rules may determine how updated data is to be interpreted and processed.

The one or more rules may be managed according to Rule Management Module 964, which may provide an interface through which a user may define rules for determining what is to be extracted from the updated operational log, or in the case that the ETL component Module is coupled to multiple data stores, from the updated operational logs.

Transformation Module 960 may take the extracted subset of data from the operational log and transform the data format of the extracted subset of data into a data format for a target database. The transformation may be performed according to transformation rules specifying the target format, for example, a format suitable for data objects described above into which aggregated data is to be stored.

Loading Module 962 may communicate with over a network or directly interface with a target data store into which the transformed data is to be loaded. In cases of direct communication with a target data store, the Loading Module 962 may communicate through an application programming interface for a process on the target database. In other cases, a data packet transmitted over a network may be defined for storing the data to be loaded, including information regarding the source and contents of the data, and any other routing data or metadata for the data to be uploaded.

Output 966 may be the data to be loaded or Output 966 may be information regarding interactions with a user interface for managing rules.

Example Computing Environment

FIG. 8 depicts an illustration, according to one embodiment, of a computing environment in which an data aggregator or ETL component may operate. While this example computing environment uses the context of analytics data and transactional data, as noted above, other types of data may serve as the sources for data to be aggregated or for data to be extracted, transformed, and loaded from one data store to another data store.

In some embodiment, an ETL component may reside within an analytics data database, such as ETL Component 410 within Analytics Data 204. In such a case, the ETL component may use rules configured or defined to identify particular subsets of analytics data. While in some cases the ETL component within the analytics data store may access an operational log, in other cases, the ETL component may poll the analytics data store directly without using an operational log. Collection of analytics data may be performed in a variety of ways, and the disclosed embodiments do not depend on any particular method for the collection of analytics data.

For example, based on the extraction rules, the ETL component may generate a query to extract corresponding data. In this example, Analytics Data 204 may be updated based on analytics data collected from Analytics Server 806, and possibly from other analytics data servers. Further, similar to the embodiments described above with regard to FIG. 4, an ETL component for an analytics data store may communicate and extract data from multiple analytics data stores.

In some embodiments, an ETL component may reside within a transactional database, such as Transactional Data 202. In such a case, as described above in regard to FIG. 4, the ETL component may communicate with a data aggregator in order for the ETL component to deliver or load extracted and transformed data from Transactional Data 202 into, for example, Aggregated Data 206.

In other embodiments, an ETL component and a data aggregator may operate on systems that are directly coupled, as depicted with the link 814. In such a configuration, the ETL component and data aggregator may communicate over a defined application programming interface (API). For example, API 816 within Data Aggregator 207 may provide for calls to enable data uploads, and to respond for a request for one or more rules. Similarly, API 818 within ETL component 410 may provide for calls to enable the loading or modification of one or more extraction rules, or the loading or updating of a transformation rule—for example in response to a changed data object format used within Aggregated Data 206.

As discussed elsewhere, transactional data may be generated based on user interactions with a search marketing tool, such as Search Marketing Tool 402. As depicted within FIG. 8, the search marketing tool may include Data Aggregator 207 and User Interface 406.

In some embodiment, search engines provide tools similar to the functionality of a search marketing tool, such as for providing keyword bid management and keyword management. As depicted within Search Engine 812a, a search engine may include an interface such as User Interface 406, described in various embodiments above. In other cases, as depicted within Search Engine 812a, a search engine may simply incorporate the functionality of a data aggregator, such as Data Aggregator 207. In such a case, the search engine may provide a user with report building tools that may allow a user to generate reports based on aggregated data.

Example Computer System

Figure 10:
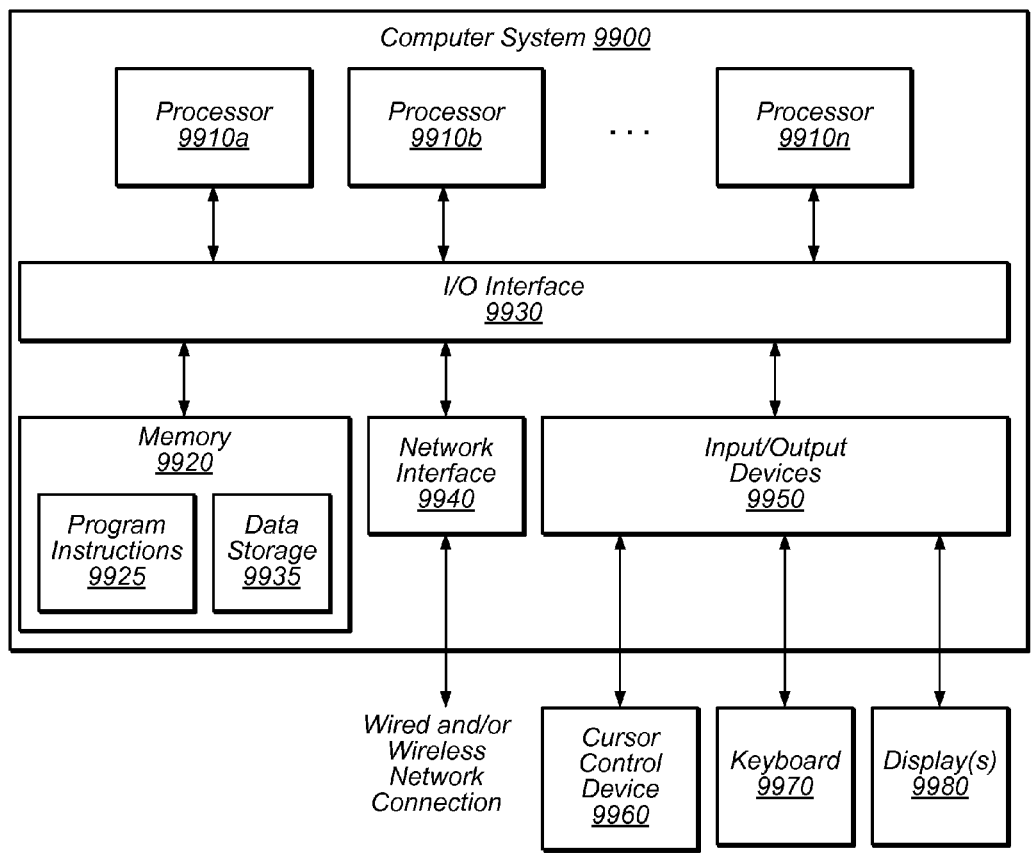
FIG. 10 depicts elements of an example computer system capable of implementing an data aggregator.

FIG. 10 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9910a-9910n coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. A non-transitory computer-readable storage medium may include storage media or memory media such as magnetic or optical media such as disks or DVD/CD-ROM, volatile or non-volatile media such as RAM, ROM, and flash drives. More generally, computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        accessing an operational log to detect an update to a transactional database, wherein the transactional database updates the operational log when transactional data is received, wherein the update indicates a delta from a previous version of the operational log, and wherein the transactional data is generated when Internet marketing is performed and comprising an attribute for a keyword, an ad, a group that includes certain keywords or ads, or a marketing campaign;
        in response to detecting an update, extracting a subset of data from the operational log without accessing the transactional database;
        in response to detecting the update, transforming the extracted subset of data into transformed data by aggregating the subset of data having a same attribute value for the attribute and occurring within a same time range; and
        storing the transformed data in a corresponding time range specific field of a data object, the data object having one or more time range specific fields.

2. The method of claim 1, further comprising:
    accessing another operational log of an analytic database to detect an update to the analytic database;
    in response to detecting the update to the analytic database, extracting an additional subset of data from the other operational log without accessing the analytic database;
    transforming the additional extracted subset of data by aggregating the subset of data into the data object, wherein the data object aggregates analytic data having a same time range; and
    loading, into a second database, the other transformed subset of data.

3. The method of claim 2, wherein the analytic database is an online analytical processing (OLAP) database, and wherein the transactional database is not an OLAP database.

4. The method of claim 1, wherein the extracting is based on one or more rules that are configurable.

5. The method of claim 4, wherein the one or more rules are designed to identify attribute-based data in accord with attribute data used for indexing into the data object.

6. The method of claim 1, wherein the data object is capable of storing both attribute-based data and metrics-based data.

7. The method of claim 1, wherein the first database is an analytics database that stores metrics-based data.

8. The method of claim 1, wherein the transactional database stores attribute-based data and updates the operational log as transactional data is received.

9. The method of claim 1, wherein storing the transformed data in the corresponding time range specific field of the data object enables the transformed data to be accessed without accessing the transactional database.

10. The method of claim 1, further comprising:
    receiving, from a user, a query related to data included in the transactional database;
    identifying, using the query, an existing data object; and
    determining, using the existing data object, results for the query.

11. A non-transitory computer-readable storage medium storing program instructions, wherein the program instructions are computer executable to implement:
    aggregating data from at least two different data sources, wherein said aggregating comprises:
        accessing an operational log to detect an update to a transactional database, wherein the transactional database updates the operational log when transactional data is received, wherein the update indicates a delta from a previous version of the operational log, and wherein the transactional data is generated when Internet marketing is performed and comprising an attribute for a keyword, an ad, a group that includes certain keywords or ads, or a marketing campaign;
        in response to detecting the update, transforming the extracted subset of data into transformed data by aggregating the subset of data having a same attribute value for the attribute and occurring within a same time range; and storing the transformed data in a corresponding time range specific field of a data object, the data object having one or more time range specific fields.

12. The non-transitory computer-readable storage medium of claim 11, wherein the extracting is based on one or more rules that are configurable.

13. The non-transitory computer-readable storage medium of claim 12, wherein the one or more rules are designed to identify attribute-based data in accord with attribute data used for indexing into the data object.

14. A system, comprising:
    at least one processor; and
    a memory comprising program instructions, wherein execution of the program instructions cause the at least one processor to perform: aggregating data from at least two different data sources, wherein said aggregating comprises:
        accessing an operational log to detect an update to a transactional database, wherein the transactional database updates the operational log when transactional data is received, wherein the update indicates a delta from a previous version of the operational log, and wherein the transactional data is generated when Internet marketing is performed and comprising an attribute for a keyword, an ad, a group that includes certain keywords or ads, or a marketing campaign;

in response to detecting an update, extracting a subset of data from the operational log without accessing the transactional database;

in response to detecting the update, transforming the extracted subset of data into transformed data by aggregating the subset of data having a same attribute value for the attribute and occurring within a same time range; and storing the transformed data in a corresponding time range specific field of a data object, the data object having one or more time range specific fields.

15. The system of claim 14, wherein the extracting is based on one or more rules that are configurable.

16. The system of claim 15, wherein the one or more rules are designed to identify attribute-based data in accord with attribute data used for indexing into the data object.

17. The method of claim 15, further comprising:
obtaining the one or more rules, the one or more rules identifying one or more types of logging updates that are of interest to a user, the one or more rules corresponding to a structure of the data object.

* * * * *